(12) United States Patent
Luppino

(10) Patent No.: US 11,953,642 B2
(45) Date of Patent: Apr. 9, 2024

(54) METAL DETECTOR

(71) Applicant: Minelab Electronics Pty. Limited, Mawson Lakes (AU)

(72) Inventor: Cosmo Luppino, Mawson Lakes (AU)

(73) Assignee: Minelab Electronics Pty. Limited, Mawson Lakes (AU)

( * ) Notice: Subject to any disclaimer, the term of this patent is extended or adjusted under 35 U.S.C. 154(b) by 285 days.

(21) Appl. No.: 17/573,696

(22) Filed: Jan. 12, 2022

(65) Prior Publication Data

US 2022/0221610 A1 Jul. 14, 2022

(30) Foreign Application Priority Data

Jan. 12, 2021 (AU) ................ 2021900058

(51) Int. Cl.
| | |
|---|---|
| *G01V 3/08* | (2006.01) |
| *G01V 3/10* | (2006.01) |
| *G01V 3/165* | (2006.01) |
| *G01V 3/17* | (2006.01) |
| *G01V 13/00* | (2006.01) |
| *B29C 45/14* | (2006.01) |

(52) U.S. Cl.
CPC ............... *G01V 3/08* (2013.01); *G01V 3/165* (2013.01); *G01V 3/17* (2013.01); *G01V 13/00* (2013.01); *B29C 45/14336* (2013.01); *B29C 45/14598* (2013.01)

(58) Field of Classification Search
CPC . G01V 3/08; G01V 3/17; G01V 3/165; G01V 13/00; B29C 45/14336; B29C 45/14598

USPC .......................................................... 324/326
See application file for complete search history.

(56) References Cited

U.S. PATENT DOCUMENTS

| | | | |
|---|---|---|---|
| 2003/0211265 A1 | 11/2003 | Balbaugh et al. | |
| 2015/0346372 A1* | 12/2015 | Herrera | G01V 3/08 455/39 |
| 2016/0231448 A1 | 8/2016 | Andel | |
| 2019/0353481 A1* | 11/2019 | Bernsen | G01R 33/0076 |
| 2020/0241161 A1* | 7/2020 | Haddy | G01V 3/17 |

FOREIGN PATENT DOCUMENTS

| | | |
|---|---|---|
| CN | 201740877 U | 2/2011 |
| CN | 102900917 A | 1/2013 |
| CN | 212872936 U | 4/2021 |
| DE | 4318563 A1 | 12/1994 |
| FR | 2965638 A1 | 4/2012 |
| WO | 0143940 A1 | 6/2001 |

* cited by examiner

*Primary Examiner* — Raul J Rios Russo
(74) *Attorney, Agent, or Firm* — The Webb Law Firm

(57) ABSTRACT

Provided is a body of a hand-held metal detector which includes an elongated body with a first and second end; and a first connecting structure moulded directly onto the elongated body at the first end through an injection moulding process. The connecting structure includes an engaging portion configured to engage at least one attachment of the hand-held metal detector, such that the at least one attachment is supported by the elongated body through the connecting structure moulded directly onto the elongated body.

15 Claims, 4 Drawing Sheets

METAL DETECTOR

CROSS-REFERENCE TO RELATED APPLICATION

This application claims priority to Australian Provisional Patent Application No. 2021900058 filed Jan. 12, 2021, the disclosure of which is hereby incorporated by reference in its entirety.

BACKGROUND OF THE INVENTION

Field of the Invention

The present disclosure relates to a metal detector.

Description of Related Art

Hand-held metal detectors usually require a shaft that can support one or more control modules, a handle that can support a display module on top and an adjustable armrest. Further down the shaft a twist or cam lock is often fitted that allows a second shaft member to adjust the position of a search head to keep it close to the ground depending on the user's height and preferences.

It is advantageous to have the lightest detector possible to help the user detect for longer time periods without fatigue or tiring. However, given that metal detecting is nearly always outdoors, in usually remote harsh environments, the detector needs to be reliable and dependable. Hence the construction needs to be robust in order to withstand many knocks, and the various connected components need to remain firmly connected to the shaft so as not to have small counter movements that can disturb the user, who is nearly always fully concentrating to hear faint audio signals from the detector.

Traditional screw fastening arrangements onto round shafts can slip with time since the tightness of the clamping results in a friction grip. Initial friction grip may be in the order of 9-11 Nm, and while this is sufficient for the initial life of the detector, this friction grip falls off due to plastic creep over time to the point that the connecting structures slip with each swing of the detector sufficiently enough to become noticeable by the user. Users will then retighten the fasteners to re-establish the grip, sometimes over tightening, fracturing an already weak structure. While some solutions may employ anti-slip features such as apertures in the shaft to receive the fastener, these nearly always result in some amount of clearance between the fastener and aperture, resulting in undesirable movement between the shaft and the connecting structure. Furthermore, anti-slip features can be damaged and worn away through repeated usage making their application limited. Making these features stronger and more wear resistant always results in materials that increase weight. Another method to prevent rotation between the connecting structure and the shaft is to employ square or non-circular shafts, however said shafts are less volume efficient and nearly always result in a weight increase over a circular shaft for the equivalent strength and robustness. Hence, the need to find methods to use round shafts is a priority, as these are the most mechanically efficient and economic.

It is against this background that the present disclosure has been developed.

SUMMARY OF THE INVENTION

According to a first aspect, there is provided a body of a hand-held metal detector, comprising an elongated body with a first and second end, and a first connecting structure moulded directly onto the elongated body at the first end through an injection moulding process, wherein the connecting structure comprises an engaging portion configured to engage at least one attachment of the hand-held metal detector, such that the at least one attachment is supported by the elongated body through the connecting structure moulded directly onto the elongated body.

In one form, the engaging portion of the first connecting structure comprises at least one rail adapted to allow engagement of the attachment along the length of the rail.

In one form, the engaging portion of the first connecting structure comprises a pair of rails adapted to allow engagement of the attachment along the length of the rails.

In one form, the rails further comprise teeth, grooves or holes to facilitate locking of the attachment at specific locations along the length of the rails.

In one form, the first connecting structure comprises a second engaging portion configured to engage another attachment of the hand-held metal detector, such that the further attachment is supported by the elongated body through the connecting structure moulded directly onto the elongated body.

In one form, the body further comprises a second connecting structure moulded directly onto the elongate body at a location intermediate the first and second ends, wherein the second connecting structure comprises a third engaging portion configured to engage a handle or a grip, such that the handle or grip is supported by the elongated body through the second connecting structure moulded directly onto the elongated body.

In one form, the elongated body is a tubular shaft.

In one form, the tubular shaft is made from a fibre reinforced composite.

In one form, the tubular shaft is made from an aluminium alloy.

In one form, one or all of the connecting structures are made from a thermoplastic polymer.

In one form, the thermoplastic polymer is reinforced with minerals and/or fibres.

In one form, the elongated body comprises features to engage with the one or all of the connecting structures.

In one form, the features are holes, slots, knurling or grooves.

BRIEF DESCRIPTION OF DRAWINGS

Embodiments of the present invention will be discussed with reference to the accompanying drawings wherein.

DESCRIPTION OF THE INVENTION

Figure 1:
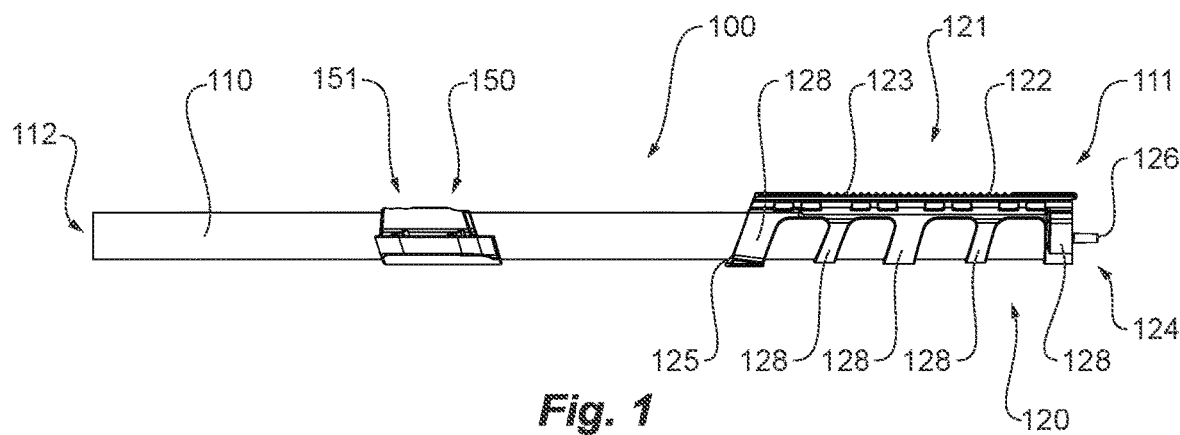
FIG. 1 is a side view of a body of a hand-held metal detector, according to an embodiment.
Figure 2:
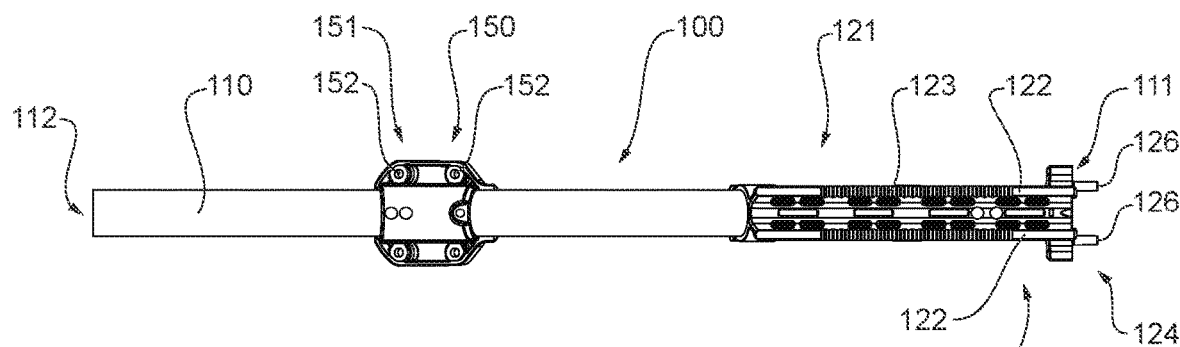
FIG. 2 is a top view of the body of a hand-held metal detector of FIG. 1.

Referring now to FIGS. 1 to 7, where there is shown a body of a hand-held metal detector 100, according to an embodiment, comprising an elongated body 110 with a first and second end 111, 112 and a connecting structure 120 moulded directly onto the elongated body 110 at the first end 111 through an injection moulding process. The connecting structure 120 comprises an engaging portion 121 configured to engage at least one attachment of the hand-held metal detector 100, such that the at least one attachment is supported by the elongated body 110 through the connecting structure 120 moulded directly onto the elongated body 110 at the first end 111.

Figure 3:
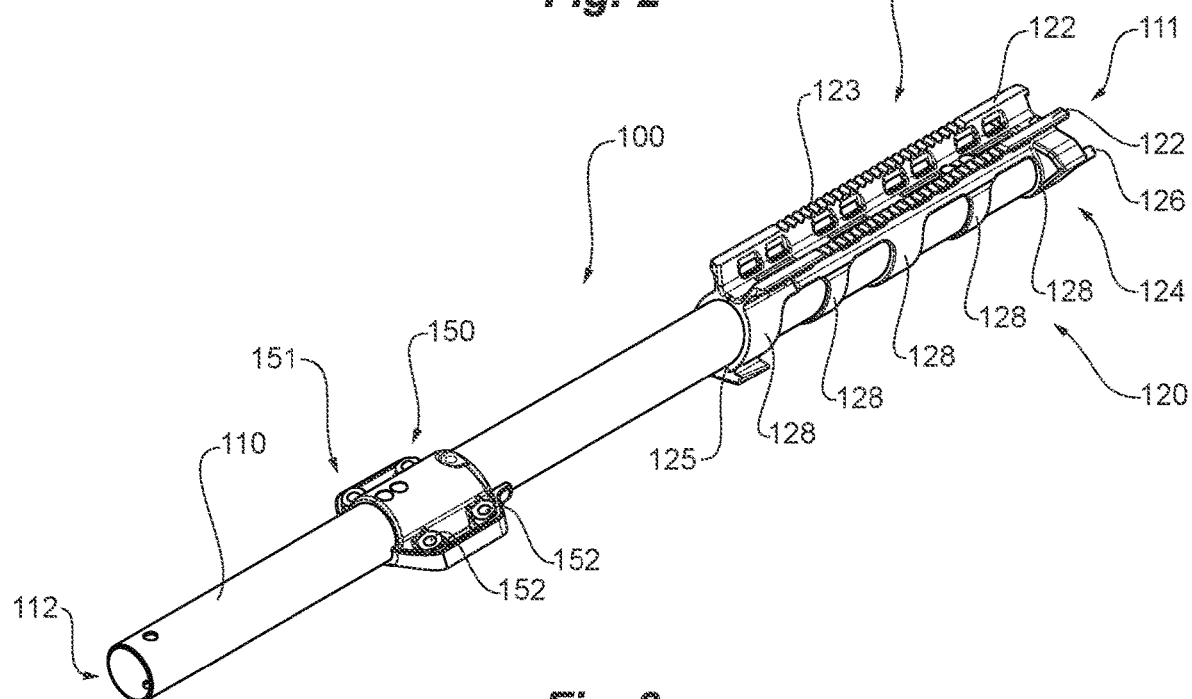
FIG. 3 is a front perspective view of the body of a hand-held metal detector of FIG. 1.
Figure 6:
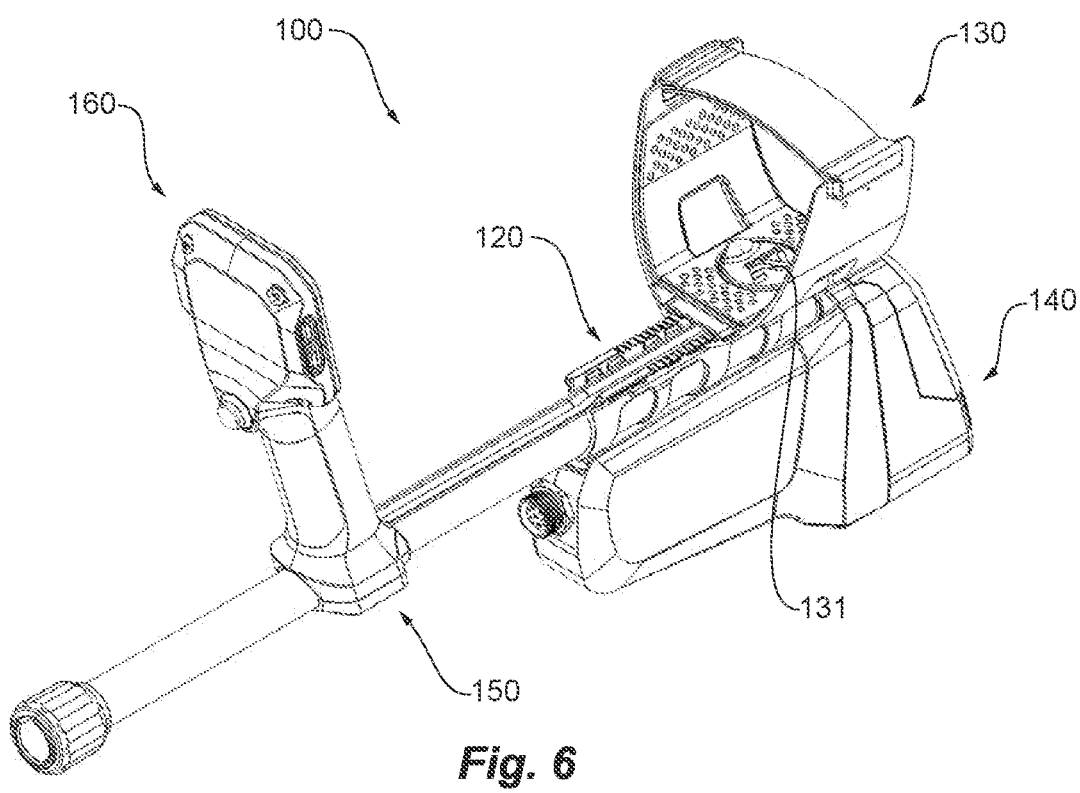
FIG. 6 is a front perspective view of the body of a hand-held metal detector of FIG. 1 fitted with a variety of attachments.
Figure 7:
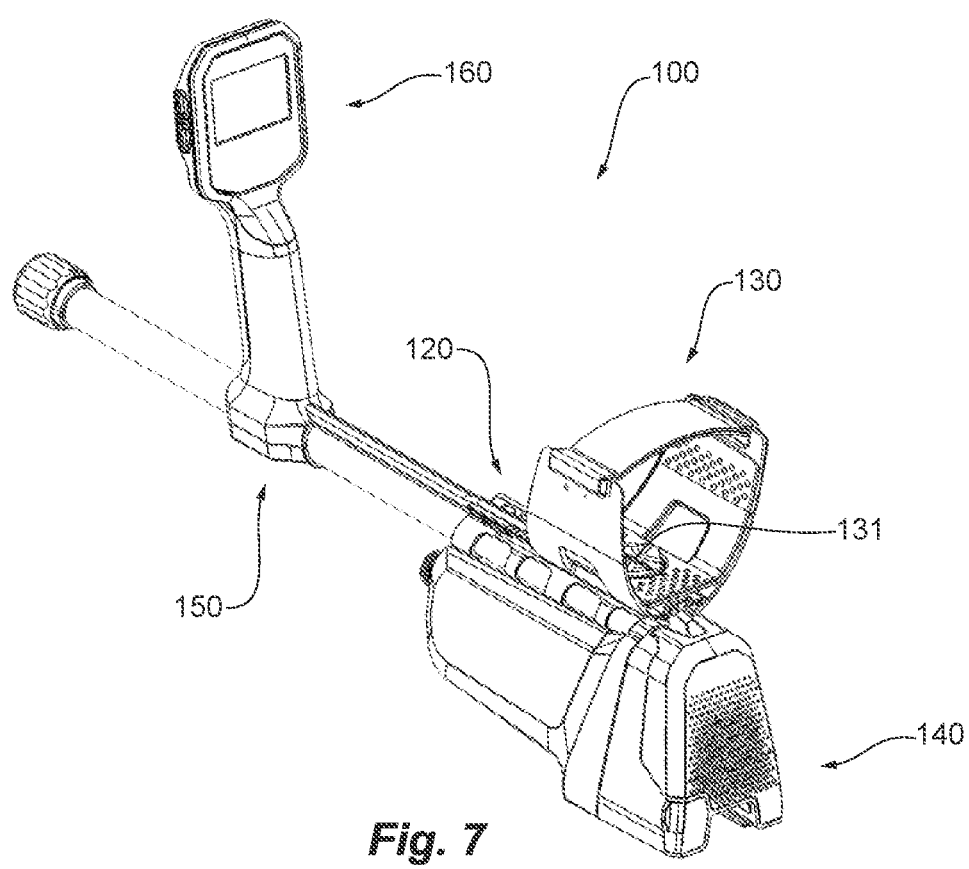
FIG. 7 is a rear perspective view of the body of a hand-held metal detector of FIG. 1 fitted with a variety of attachments.

As best shown in FIG. 3, the engaging portion 121 of the connecting structure 120 comprises a pair of parallel rails 122 adapted to allow engagement of the attachment along the length of the rails 122. The engaging portion 121 also features a plurality of teeth 123 which facilitate locking of the attachment at specific locations along the length of the rails 122. As best shown in FIGS. 6 and 7, where the body 100 is shown fitted with a variety of attachments, the attachment is an arm cuff 130 which is configured to be slidably retained by the rails 122 and features a locking mechanism 131 that is able to selectively engage with the teeth 123 at any point along the rails 122.

While in the embodiment shown, the connecting structure 120 comprises a pair of rails 122 to which the arm cuff 130 is engaged, it will be appreciated that a single rail and alternative locking arrangements (such as grooves or holes) are also considered to fall within the scope of this disclosure.

Figure 4:
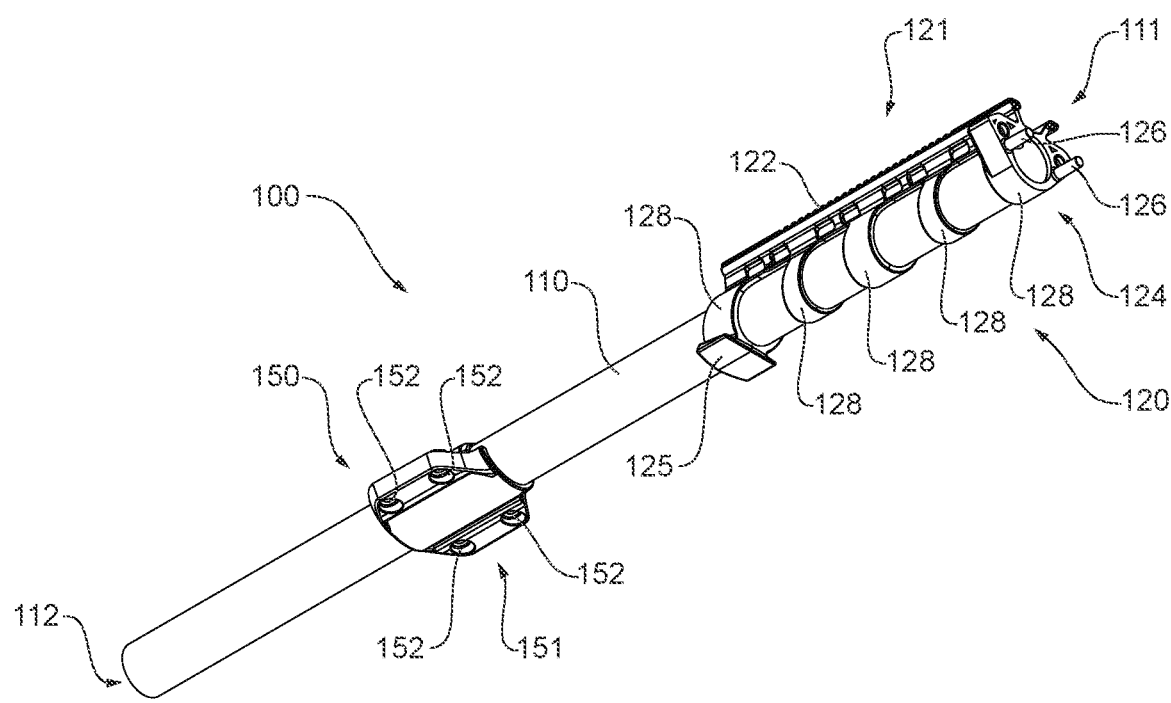
FIG. 4 is a rear perspective view of the body of a hand-held metal detector of FIG. 1.

As best shown in FIG. 4, the connecting structure 120 further comprises a second engaging portion 124 configured to engage another attachment of the hand-held metal detector 100, such that the further attachment is also supported by the elongated body 110 through the connecting structure 120 moulded directly onto the elongated body 110. In this instance, the second engaging portion 124 comprises a tab 125 and a pair of locating pins 126 with which the further attachment 140 (a control module and battery pack) is slidably engaged and retained (as best shown in FIGS. 6 and 7).

Again, it will be appreciated that alternative engaging portion arrangements are also considered to fall within the scope of this disclosure. For example, in an alternate embodiment, the second engaging portion 124 may comprise features such as grooves or keyways, configured to facilitate at least a portion of the attachment being over-moulded directly on to at least a portion of the connecting structure 120.

The body 100 further comprises a second connecting structure 150 moulded directly onto the elongated body 110 at a location intermediate the first and second ends 111, 112. The second connecting structure 150 comprises a third engaging portion 151 configured to engage a handle or grip 160 (as shown in FIGS. 6 and 7) such that the handle or grip 160 is supported by the elongated body 110 through the second connecting structure 150 moulded directly onto the elongated body 110.

It can be seen that the third engaging portion 151 comprises a plurality of apertures 152 through which fasteners (not shown) are used to secure the handle or grip 160 to the second connecting structure 150. In alternate embodiments, fewer or more fasteners 152 may be used, and may be used in combination with other securing means such as clamps or dovetails.

Alternative means for securing the handle or grip 160 to the second connecting structure 150 may also include a pivot and clamp arrangement that allows the handle or grip 160 to pivot with respect to the shaft 110, for stowage and/or to suit ergonomic preferences of the user. A further embodiment may provide toothed rails similar to those provided on the first connecting structure 120, allowing the user to position the handle or grip 160 at a location they prefer. In yet a further embodiment, the third engaging portion 151 may comprise features such as grooves or keyways, configured to facilitate the handle or grip 160 being over-moulded directly on to at least a portion of the connecting structure 150.

Figure 8:
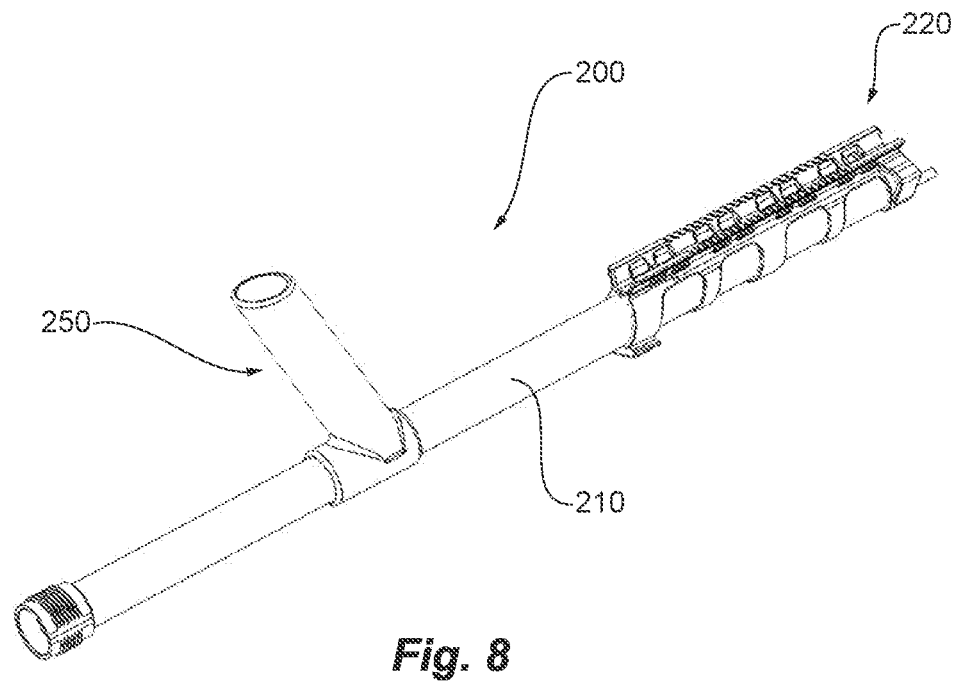
FIG. 8 is a front perspective view of a body of a hand-held metal detector, according to a second embodiment.
Figure 9:
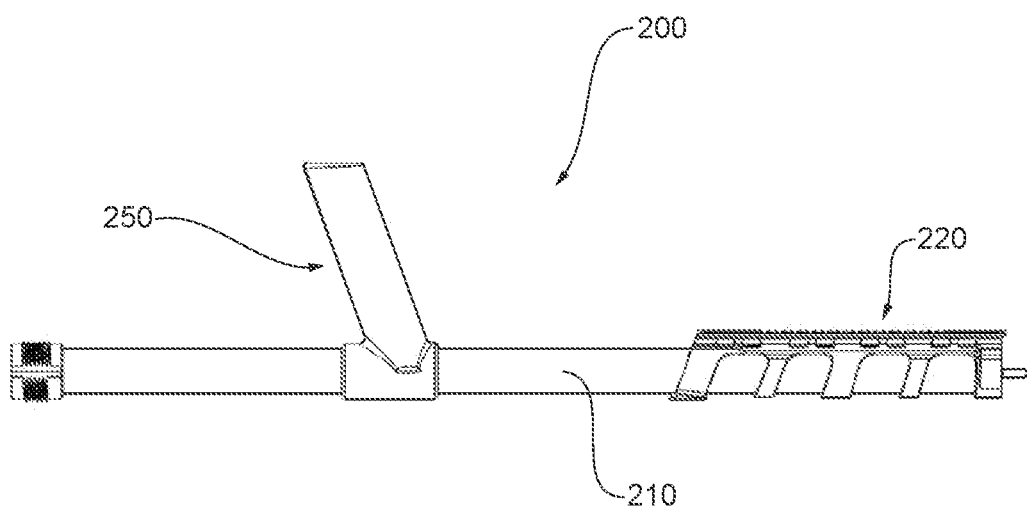
FIG. 9 is a side view of the body of a hand-held metal detector of FIG. 8.

Referring now to FIGS. 8 and 9 where there is shown a body of a hand-held metal detector 200, according to a second embodiment, featuring the same first connecting structure 220 but an alternate second, intermediate structure 250, wherein an entire handle or grip has been moulded directly onto the elongated body 210 through an injection moulding process.

In both embodiments, the elongated body 110, 210 is a tubular shaft, which may be made from a lightweight material, ideally with a high specific strength such as a carbon fibre reinforced polymer. Other suitable materials may include titanium or aluminium alloys. While the tubular shaft has a circular cross-section, it will be appreciated that alternative cross-sections would also be considered to fall within the scope of this disclosure.

In both embodiments, the connecting structures 120, 150, 220, 250 are made from a thermoplastic polymer which may be reinforced with various minerals and/or fibres. In a preferred form, the connecting structures 120, 150, 220, 250 are made from various types of Polyamides (such as Nylon 6, 66, 12, 10, 6/12, 6/10, etc), however, it will be appreciated that alternative thermoplastic polymers, such as ABS, Polycarbonate, Polypropylene and Polyesters and reinforcing materials such as glass, minerals, talc and carbon may also be employed.

The general qualities of the thermoplastics employed are that they are rigid with a Shore D hardness typically above 45. It will be appreciated that the thermoplastics employed need to maintain their rigidity and resistance to creep over a wide range of temperatures typically achieved in metal detecting regions around the world.

Figure 5:
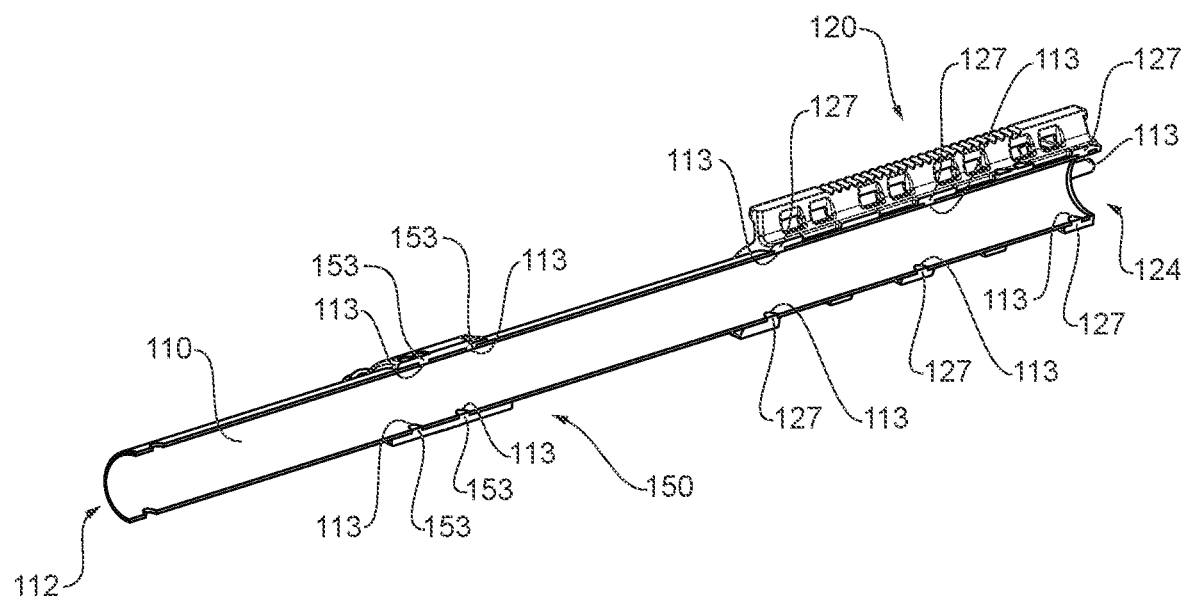
FIG. 5 is a cross-sectional view of the body of a hand-held metal detector of FIG. 1.

The connecting structures 120, 150, 220, 250 are injection moulded over the tubular shaft 110, 210, such that they shrink during cooling and form a tight bond with the shaft 110, 210. As shown in FIG. 5, the tubular shaft 110 may be provided with apertures 113 through which an amount of the connecting structure 120, 150 polymer flows during the injection moulding process and forms projections 127, 153 within each aperture 113. During the injection moulding process, a mandrel is inserted within the shaft 110 to prevent the polymer flowing into the shaft 110, thus allowing a second shaft (not shown) to telescope within the shaft 110. The polymer fills each aperture 113 completely, eliminating any clearances that can initiate wear or micro movement. It will be appreciated that in addition to the tight bond formed by each of the connecting structures 120, 150 shrinking over the shaft 110, that the relationship between the projections 127, 153 and the apertures 113, further acts to prevent, or reduce, rotation or translation of the connecting structures 120, 150 with respect to the shaft 110. It will be appreciated that this resistance to rotation and translation is achieved in a different manner to traditional securing methods which rely upon a tight clamping force which can work loose over time.

While in the embodiment shown, the shaft 110 is provided with apertures 113, it will be appreciated that alternative means to engage with the connecting structures, 120, 150 may include slots, grooves or even knurling formed in or on the shaft 110.

The first connecting structure 120 also features bands 128 that wrap around the shaft 110 rather than having a solid body that completely encloses the shaft 110. It will be appreciated that this material reduction has weight saving benefits, while still achieving a satisfactory engagement with the shaft 110. Further material reduction is also achieved by providing slotted holes in the rails 122.

It will be appreciated that the above disclosure provides a light weight, yet robust body for a hand-held metal detector, capable of withstanding environmental and physical stresses exerted on it. By virtue of the connecting structures being moulded directly onto the shaft, the connected components, such as grips, arm cuffs, control modules and batteries are firmly connected to the shaft so as not to have small counter movements that can disturb the user. Furthermore, the direct moulding provides a fastenerless solution, which is not susceptible to vibration, loosening, creep or cracking over time, and also improves the overall assembly process by requiring fewer parts, faster assembly and not requiring a jig to correctly align components.

By not requiring fasteners to secure the connecting structures to the shaft, wall sections of the connecting structures are able to be reduced and reinforcing fibre content is also able to be reduced (since they do not need strength for traditional fastener attachment or clamping methods). The shafts themselves can also be thin walled as they do not need to support local stresses from torqued up fasteners clamping hard on the shaft. It will also be appreciated that the connecting structures supplement the strength of the shaft locally, hence in alternate embodiments, variable wall section shafts may be employed to reduce wall section where the connecting structure is supporting the shaft.

It will be appreciated that direct moulding also eliminates the need for gluing processes, which require time consuming and costly clean up, fume cupboards and precision dispensing as well as surface preparation to facilitate bonding. It will also be appreciated that a wider range of thermoplastics can be employed which have traditionally been excluded from traditional methods because of their low surface energy and difficulties in bonding.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A body of a hand-held metal detector, comprising:
   an elongated body with a first and second end; and
   a first connecting structure moulded directly onto the elongated body at the first end through an injection moulding process;
   wherein the connecting structure comprises an engaging portion configured to engage at least one attachment of the hand-held metal detector, such that the at least one attachment is supported by the elongated body through the connecting structure moulded directly onto the elongated body.

2. The body of the hand-held metal detector as claimed in claim 1, wherein the engaging portion of the first connecting structure comprises at least one rail adapted to allow engagement of the attachment along the length of the at least one rail.

3. The body of the hand-held metal detector as claimed in claim 2, wherein the engaging portion of the first connecting structure comprises a pair of rails adapted to allow engagement of the attachment along the length of the pair of rails.

4. The body of the hand-held metal detector as claimed in claim 3, wherein the pair of rails further comprise teeth, grooves or holes to facilitate locking of the attachment at specific locations along the length of the pair of rails.

5. The body of the hand-held metal detector as claimed in claim 1, wherein the first connecting structure comprises a second engaging portion configured to engage another attachment of the hand-held metal detector, such that the further attachment is supported by the elongated body through the connecting structure moulded directly onto the elongated body.

6. The body of the hand-held metal detector as claimed in claim 5, wherein the second engaging portion comprises features configured to facilitate at least a portion of the further attachment being over-moulded directly onto at least a portion of the first connecting structure.

7. The body of the hand-held metal detector as claimed in claim 1, further comprising a second connecting structure moulded directly onto the elongated body at a location intermediate the first and second ends; wherein the second connecting structure comprises a third engaging portion configured to engage a handle or a grip, such that the handle or grip is supported by the elongated body through the second connecting structure moulded directly onto the elongated body.

8. The body of the hand-held metal detector as claimed in claim 7, wherein the third engaging portion comprises features configured to facilitate the handle or grip being over-moulded directly on to at least a portion of the second connecting structure.

9. The body of the hand-held metal detector as claimed in claim 1, wherein the elongated body is a tubular shaft.

10. The body of the hand-held metal detector as claimed in claim 9, wherein the tubular shaft is made from a fibre reinforced composite.

11. The body of the hand-held metal detector as claimed in claim 9, wherein the tubular shaft is made from an aluminium alloy.

12. The body of the hand-held metal detector as claimed in claim 1, wherein one or all of the connecting structures are made from a thermoplastic polymer.

13. The body of the hand-held metal detector as claimed in claim 12, wherein the thermoplastic polymer is reinforced with minerals and/or fibres.

14. The body of the hand-held metal detector as claimed in claim 1, wherein the elongated body comprises features to engage with the one or all of the connecting structures.

15. The body of the hand-held metal detector as claimed in claim 14, wherein the features are holes, slots, knurling or grooves.

\* \* \* \* \*